United States Patent
Mohr et al.

(10) Patent No.: US 6,321,031 B1
(45) Date of Patent: Nov. 20, 2001

(54) CONTROL CIRCUIT FOR A DC MOTOR

(75) Inventors: Thomas Mohr; Karl-Heinrich Preis, both of Buehlertal; Wolfgang Schwenk, Oberkirch-Tiergarten; Robert Kern, Buehlertal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,604

(22) PCT Filed: Jul. 23, 1998

(86) PCT No.: PCT/DE98/02068

§ 371 Date: Jun. 2, 1999

§ 102(e) Date: Jun. 2, 1999

(87) PCT Pub. No.: WO99/05780

PCT Pub. Date: Feb. 4, 1999

(30) Foreign Application Priority Data

Jul. 25, 1997 (DE) ............................................. 197 32 098

(51) Int. Cl.[7] ...................................................... H02P 5/06
(52) U.S. Cl. ............................................. 388/801; 318/287
(58) Field of Search .................................. 318/139, 286, 318/287, 439; 388/801, 806

(56) References Cited

U.S. PATENT DOCUMENTS

| 3,624,475 | * | 11/1971 | Smith | 318/341 |
|---|---|---|---|---|
| 3,629,608 | * | 12/1971 | Trindle | 307/140 |
| 4,257,092 | * | 3/1981 | Prines et al. | 363/124 |
| 4,258,304 | * | 3/1981 | Bourke | 320/2 |
| 4,374,347 | * | 2/1983 | Muller | 318/138 |
| 4,689,711 | * | 8/1987 | Conzelmann et al. | 361/91 |
| 4,720,668 | * | 1/1988 | Lee et al. | 323/271 |
| 4,723,188 | * | 2/1988 | McMurray | 361/18 |
| 4,767,952 | * | 8/1988 | Nollet | 307/571 |
| 4,873,453 | * | 10/1989 | Schmerda et al. | 307/130 |
| 5,012,381 | * | 4/1991 | Elliott et al. | 361/84 |
| 5,872,706 | * | 2/1999 | Kern | 363/24 |
| 5,886,512 | * | 3/1999 | Becerra | 323/282 |
| 5,949,223 | * | 9/1999 | Mine | 323/224 |
| 6,005,302 | * | 12/1999 | Borho et al. | 307/32 |

FOREIGN PATENT DOCUMENTS

| 196 17947 | 7/1997 | (DE) . |
| 350 783 | 1/1990 | (EP) . |
| 07 377 085 | 12/1995 | (JP) . |

* cited by examiner

Primary Examiner—Robert E. Nappi
Assistant Examiner—Rina I. Duda
(74) Attorney, Agent, or Firm—Kenyon & Kenyon

(57) ABSTRACT

A control circuit for a direct-current motor driven in a clocked manner, includes an electrolytic capacitor connected in parallel and free-wheeling diode. Spurious radiation is reduced, in that a choke is connected between the positive motor supply voltage and the plus terminal of the electrolytic capacitor, and that the free-wheeling diode is disposed with its cathode between the choke and the electrolytic capacitor, and with its anode on the negative side of the d.c. motor.

4 Claims, 1 Drawing Sheet

CONTROL CIRCUIT FOR A DC MOTOR

FIELD OF THE INVENTION

The present invention relates to a control circuit for a direct-current motor driven in a clocked manner, having an electrolytic capacitor connected in parallel and a free-wheeling diode.

BACKGROUND INFORMATION

Such a control circuit is assumed to be known. In such a known control circuit, in the connecting lead of the motor supply voltage there are inductances in the form of chokes on the positive and negative sides to smooth out the voltage waveform caused by the clocking and to reduce the spurious radiation. These chokes must be configured for relatively high currents and an associated power loss so that they have relatively large dimensions and are also correspondingly expensive.

SUMMARY OF THE INVENTION

The underlying object of the present invention is to provide a control circuit in which the spurious radiation can be effectively reduced with more favorable circuit-engineering measures.

First of all, provision is made for a choke to be connected between the positive motor supply voltage and the plus terminal of the electrolytic capacitor, and the free-wheeling diode is disposed with its cathode between the choke and the electrolytic capacitor, and with its anode on the negative side of the d.c. motor.

Secondly, provision is made for a choke to be connected between the negative motor supply voltage and the minus terminal of the electrolytic capacitor, and the free-wheeling diode is disposed with its anode between the choke and the electrolytic capacitor, and with its cathode on the positive side of the d.c. motor.

This arrangement of the choke in conjunction with the free-wheeling diode and the electrolytic capacitor has the benefit that it can be configured for only relatively low currents, e.g., 6A (unlike conventional chokes of 30A), significantly smaller dimensions and a reduction in costs being obtained as a result.

If, in addition, a polarity reversal protection device is provided, then a circuit arrangement is advantageous which is designed such that an inversely operated n-channel power MosFet [MOSFET] is connected as a polarity reversal protection device between the choke and the positive supply voltage, or rather which is designed in the alternative, such that an inversely operated n-channel power MOSFET is connected as a polarity reversal protection device between the choke and the negative supply voltage.

DETAILED DESCRIPTION

Figure 1:
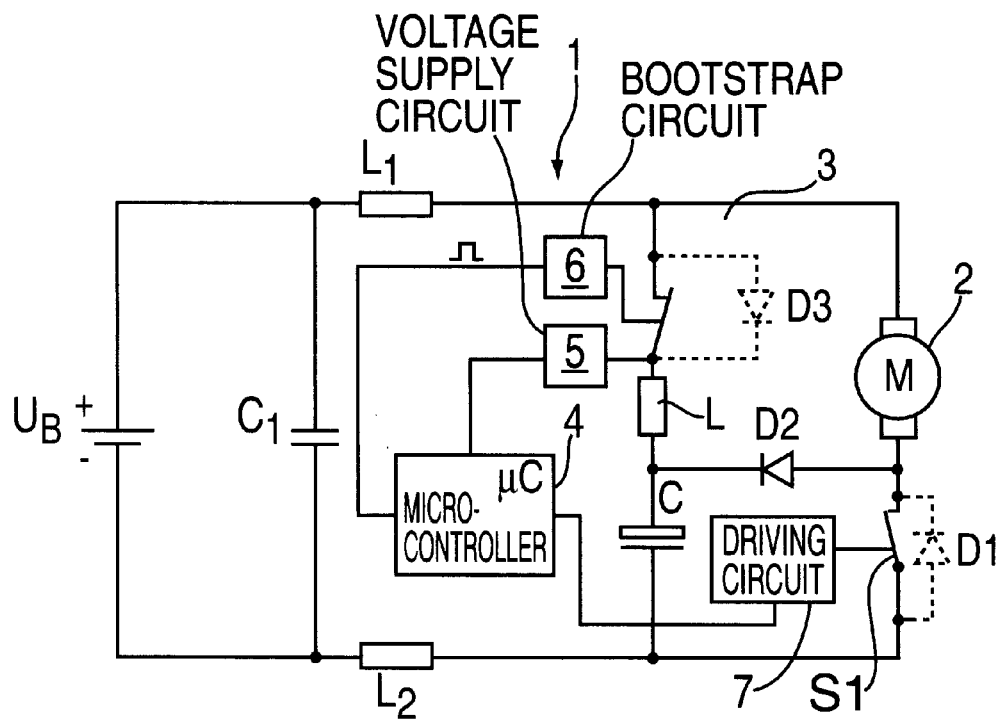
FIG. 1 shows an exemplary embodiment of a control circuit for a d.c. motor according to the present invention.

FIG. 1 shows an exemplary embodiment according to the present invention of a control circuit 1 for a d.c. motor 2 driven, e.g., with a switching frequency of 20 kHz with pulsewidth modulation. The clocked driving is effected via a switching device S1 in the form of a power MOSFET with an integrated diode D1 that lies in the blocking direction with respect to the conventional polarity of the supply voltage, i.e., battery voltage $U_B$. On the negative side of the motor 2, a free-wheeling diode D2 is connected with its anode.

In the control circuit 1, in the incoming and outgoing lines of the supply voltage, there are inductances $L_1$ and $L_2$ which are not necessary and are significantly reduced compared to conventional circuits, these inductances $L_1$ and $L_2$ being used to smooth out the voltage waveform influenced by the clock frequency and to reduce the spurious radiation.

Arranged in parallel with d.c. motor 2 is an electrolytic capacitor C which is connected with its plus terminal, via a further choke L and a polarity reversal protection device in the form of a contact unit 3, to the positive supply voltage, whereas the minus terminal is disposed at the negative supply voltage line. Free-wheeling diode D2 is connected with its cathode between electrolytic capacitor C and further choke L. In parallel with battery supply voltage $U_B$, there is a further capacitor $C_1$, which is formed as a foil capacitor.

Contact unit 3 is formed preferably as an inversely operated n-channel power MOSFET having a diode D3 connected in parallel to the drain-source path, the diode D3 being connected with its anode to the plus potential and with its cathode to further choke L. Also connected via a supply voltage circuit 5 to this connecting point between further choke L and contact unit 3 is a microcontroller 4, which is disposed with a further terminal via a bootstrap circuit 6 on the positive connecting point of contact unit 3. The microcontroller serves, u.a., to control switching device S1 via a driving circuit 7 and thus to dirve d.c. motor 2. In case of incorrect polarity of battery voltage supply $U_B$, with the assistance of contact unit 3, the current into electrolytic capacitor C and through free-wheeling diode D2 is interrupted, and their destruction thereby hindered. Moreover, the voltage supply of microcontroller 4 is interrupted.

The described arrangement of choke L makes it possible to configure it for relatively small currents, for example, given a 30 amp ventilator motor in the motor vehicle, for 6A, and thus its dimensions can be kept very small. Simultaneously, chokes $L_1$ and $L_2$ can be significantly reduced or eliminated. A significant cost reduction is also achieved as a result.

Only a d.c. current flows through further choke L, since the alternating component is blocked by further choke L.

Figure 2:
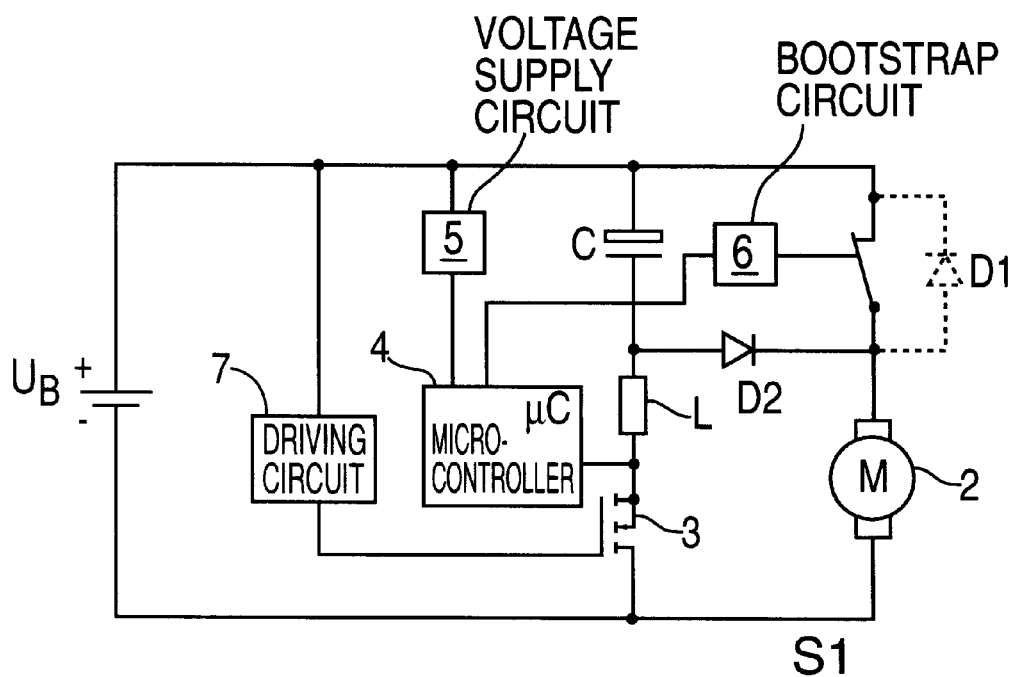
FIG. 2 shows another exemplary embodiment of the control circuit for a d.c. motor according to the present invention.

In an alternative exemplary embodiment according to the present invention of control circuit 1 according to FIG. 2, switching device S1 for the clocked driving is connected on the plus side of d.c, motor 2 (high-side switch). Here, choke L is connected between the negative motor supply voltage and the minus terminal of electrolytic capacitor C, and free-wheeling diode D2 is disposed with its anode between choke L and electrolytic capacitor C, and with its cathode on the positive side of d.c. motor 2. Polarity reversal protection device 3 is arranged as an inversely operated n-channel power MOSFET between choke L and the negative supply voltage.

What is claimed is:

1. A control circuit arrangement for a direct-current motor, the motor being driven in a clocked manner, comprising:
    an electrolytic capacitor connected in parallel with the motor;
    a choke coupled between a positive motor supply voltage and a plus terminal of the electrolytic capacitor;

a free-wheeling diode including a cathode and an anode, the cathode being coupled between the choke and the electrolytic capacitor, the anode being coupled to a negative motor supply voltage; and a polarity reversal protection device;

wherein the polarity reversal protection device is coupled between the choke and the positive motor supply voltage.

2. The control circuit arrangement according to claim 1, wherein the polarity reversal protection device includes an inversely operated n-channel power MOSFET.

3. A control circuit arrangement for a direct-current motor, the motor being driven in a clocked manner, comprising:

an electrolytic capacitor connected in parallel with the motor;

a choke coupled between a negative motor supply voltage and a minus terminal of the electrolytic capacitor; and a free-wheeling diode including a cathode and an anode, the anode being coupled between the choke and the electrolytic capacitor, the cathode being coupled to a positive motor supply voltage.

4. The control circuit arrangement according to claim 3, further comprising:

a polarity reversal protection device including an inversely operated n-channel power MOSFET, the polarity reversal protection device being coupled between the choke and the negative motor supply voltage.

\* \* \* \* \*